(12) United States Patent
McCullough

(10) Patent No.: US 9,273,797 B2
(45) Date of Patent: Mar. 1, 2016

(54) CHAIN VALVE RELEASE TOOL

(71) Applicant: Josh R. McCullough, Beaumont, TX (US)

(72) Inventor: Josh R. McCullough, Beaumont, TX (US)

(*) Notice: Subject to any disclaimer, the term of this patent is extended or adjusted under 35 U.S.C. 154(b) by 13 days.

(21) Appl. No.: 14/274,369

(22) Filed: May 9, 2014

(65) Prior Publication Data

US 2015/0323094 A1    Nov. 12, 2015

(51) Int. Cl.
*B66F 19/00*      (2006.01)
*F16K 31/44*      (2006.01)

(52) U.S. Cl.
CPC ............. *F16K 31/44* (2013.01); *B66F 19/00* (2013.01)

(58) Field of Classification Search
CPC ........... F16B 45/00; F16B 47/00; B60R 1/06; B60R 1/078; A47G 1/16; A47G 25/06; A47G 35/00; A47F 5/0823; A47F 5/0807; A47F 25/06; F16M 13/02; F16K 31/44; B66F 19/00
USPC ....................................................... 248/304
See application file for complete search history.

(56) References Cited

U.S. PATENT DOCUMENTS

| | | | | |
|---|---|---|---|---|
| 1,350,632 A | * | 8/1920 | Albrecht | 452/189 |
| 2,717,480 A | * | 9/1955 | Schulte | 280/412 |
| 3,642,147 A | * | 2/1972 | Voorhies | 211/57.1 |
| D353,502 S | * | 12/1994 | Liu | D6/514 |
| 7,789,248 B1 | * | 9/2010 | Salerno et al. | 211/85.7 |
| 2006/0249549 A1 | | 11/2006 | Giampavolo | |
| 2008/0169395 A1 | * | 7/2008 | Bullock | 248/304 |
| 2009/0249592 A1 | * | 10/2009 | Thieman | 24/591.1 |
| 2010/0084530 A1 | | 4/2010 | Lai | |

FOREIGN PATENT DOCUMENTS

WO    2013036967    3/2013

OTHER PUBLICATIONS

Web Publication (pakuya.com; result from bing.com search for "hook arm").

* cited by examiner

*Primary Examiner* — Stephen Vu

(57) ABSTRACT

Methods and apparatuses are disclosed with regard to a tool for actuating chain-operated assemblies. One embodiment includes a tool including an elongated member having a top, a bottom, and a length greater than a width. Further, the tool includes a first set of equidistantly spaced hooks in a linear arrangement along the length, wherein the first set is located closer to the top than the bottom. When one or more hooks engage the chain of the chainwheel, a further feature enables the tool to lock down on those engaged chains, and, thereby, provide safer pulling and pushing to open and close the chain-operated assembly. Further still, the tool includes at least one handle in an offset, parallel position relative to the first set, wherein the at least one handle may be located closer to the bottom than the top.

24 Claims, 6 Drawing Sheets

CHAIN VALVE RELEASE TOOL

FIELD OF DISCLOSURE

This disclosure generally relates to a tool and use thereof to actuate a chain associated with a chain-operated assembly, such as a chain valve assembly (also known as "valve chainwheels"). More particularly, this disclosure relates to methods and apparatuses having an elongated member, such as an extension pole, having one or more arrangements of a plurality of hooks for engagement, having optional locking mechanism, with a chain in order to open or close the chain-operated assembly, which may be located in a place that is difficult to reach without the tool.

BACKGROUND

Chain-operated assemblies, such as a chain valve assembly, are sometimes placed in locations that are not easily accessed for employee-safety purposes. For example, avoiding accidental openings of a valve that is located a ground level in a chemical plant, which delivers a source of hydrogen cyanide gas, an extreme poison, may be desirable. Accordingly, the chemical plant may decide to provide access to the hydrogen cyanide gas through a chain valve assembly that is less prone to accidental openings. The associated chain may wrap, at least partially, around a wheel or other component of the chain-operated valve. Upon application of a force, such as on a slack portion of the associated chain, the chain-operated assembly may actuate through pulling or pushing a chain, i.e., opening or closing, respectively. To further enhance employee-safety purpose, a security device holds the hooked chain links. Another security mechanism is for the company to elevate the chain-operated valve or other chain-operated assembly in order to prevent accidental leaks. In order to avoid dangerous climbing or maneuvering, it is desirable to provide tools and methods in order to actuate chain-operated assemblies, especially in difficult to access locations, e.g., elevated locations.

SUMMARY OF THE INVENTION

One example embodiment includes a tool including an elongated member having a top, a bottom, and a length greater than a width. Further, the tool includes a first set of equidistantly spaced hooks in a linear arrangement along the length, wherein the first set is located closer to the top than the bottom. Further still, the tool includes at least one handle in an offset, parallel position relative to the first set, wherein the at least one handle is located closer to the bottom than the top.

In another example embodiment, a method includes actuating a chain-operated assembly. The method may include engaging, with a tool, a plurality of chain-links of the chain-operated assembly, wherein the tool includes an elongated member having a top, a bottom, and a length greater than a width, a first set of equidistantly spaced hooks in a linear arrangement along the length, wherein the first set is located closer to the top than the bottom, and at least one handle in an offset, parallel position relative to the first set, wherein the at least one handle is located closer to the bottom than the top. The method also includes applying, subsequent to the engaging, a force with the tool to actuate the plurality of chain-links of the chain-operated assembly.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this disclosure and are therefore not to be considered limiting of its scope, for the disclosure may admit to other equally effective embodiments.

FIG. 3 is a FIG. 2 turned clockwise ninety degrees into the paper.

DETAILED DESCRIPTION OF THE EMBODIMENTS

The following is a detailed description of example embodiments of the invention depicted in the accompanying drawings. The embodiments are examples and are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

In addition, directional terms, such as "above," "below," "upper," "lower," "front," "back," "top," "bottom," etc., are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

Figure 1:
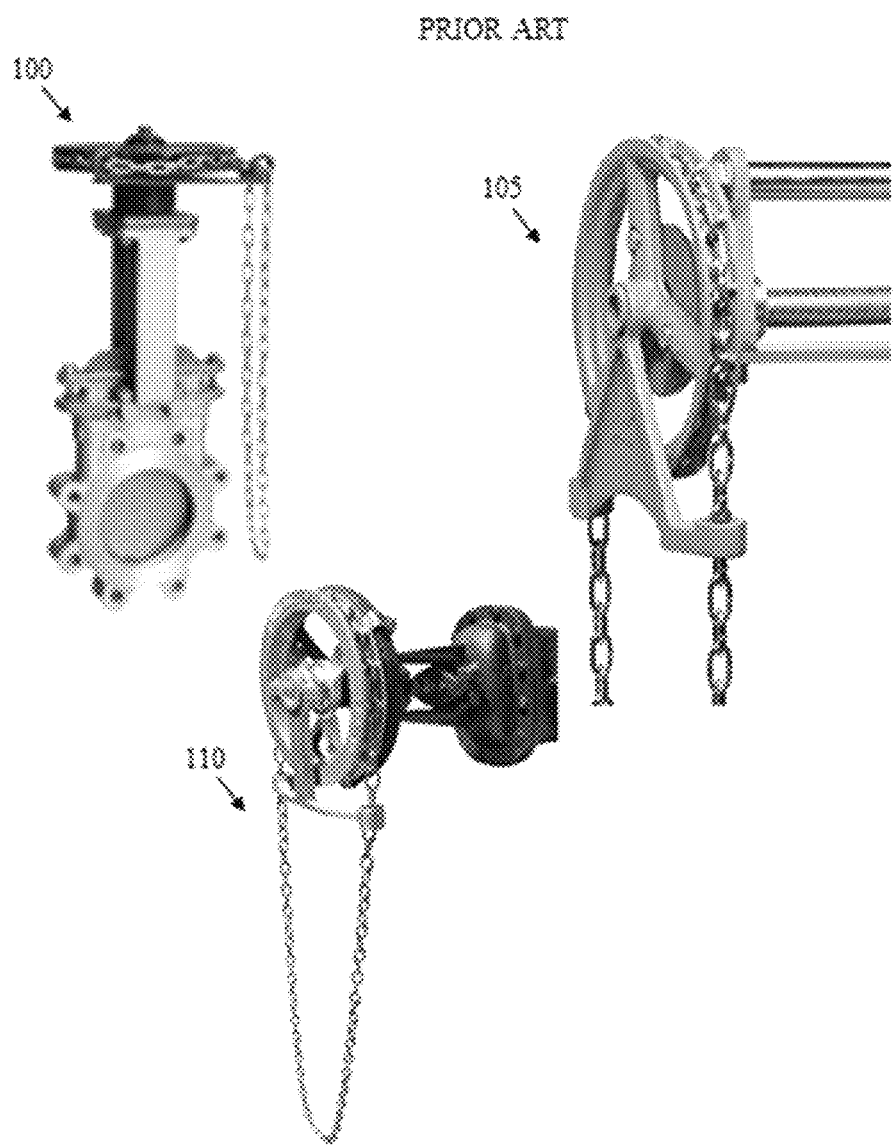
FIG. 1 depicts prior art of chain-operated assemblies existing in the art.

Generally disclosed are apparatuses and methods for actuating a chain associated with a chain-operated assembly, which is sometimes located in difficult to reach locations, such as near ceilings within factories or plants, tight spaces providing little room to no room for someone to ground themselves so that they provide the force necessary to actuate the chain, and so forth. Example chain-operated assemblies 100, 105, 110 are depicted in FIG. 1, but are merely examples of devices that operate when the tool pulls or pushes against the chain-operated machinery that actuates displacement and provides consequential results, e.g., opening a valve and closing a valve.

Figure 2:
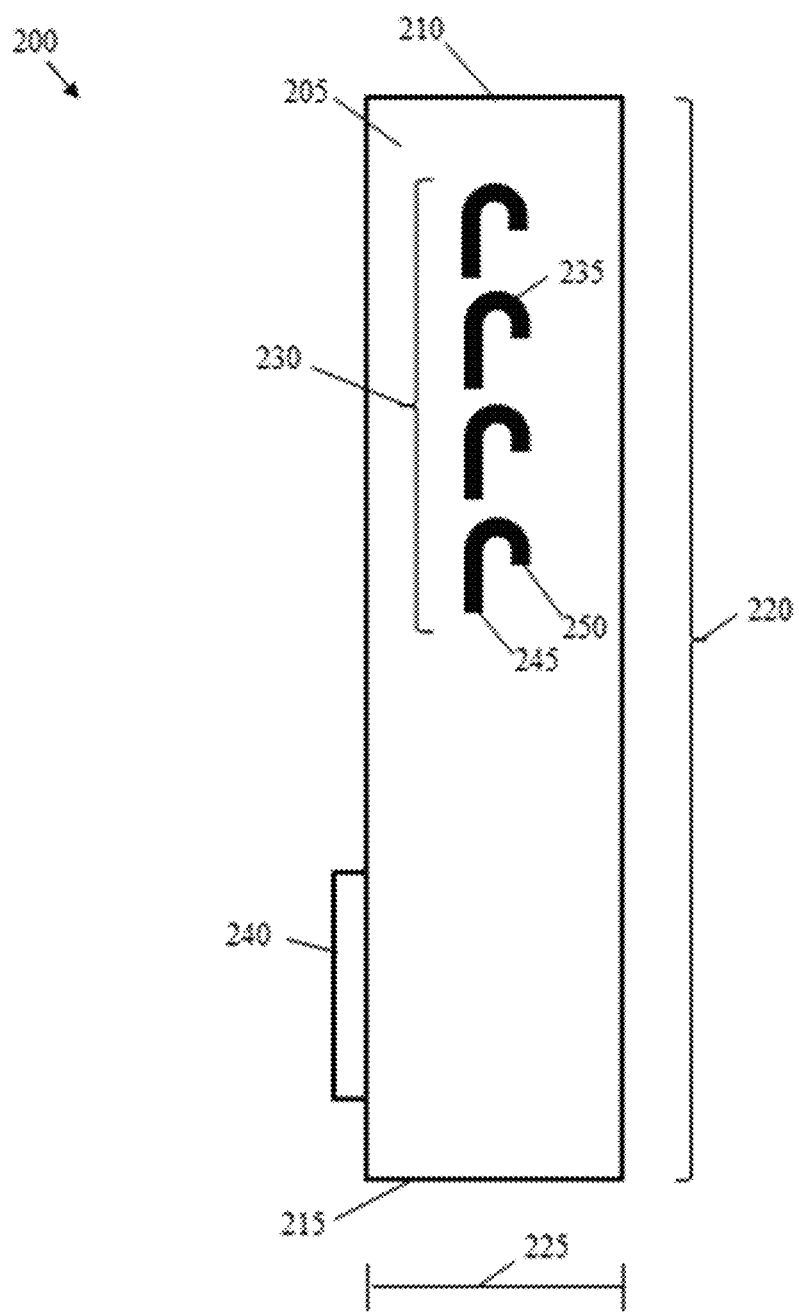
FIG. 2 depicts an example embodiment of a tool in accordance with the disclosed apparatuses and methods, wherein the figure is a front view as seen from a left side of the tool.

Turning to the next figure, FIG. 2 depicts an example embodiment of a tool 200 in accordance with the disclosed apparatuses and methods. FIG. 2 shows an elongated member 205, such a pole, which may have a rectangular, an ellipsoidal or other geometric cross section. The elongated member 205 has a top 210, a bottom 215, and a length 220 greater than its 205 width 225. For instance, the elongated member may be 10 feet, 20 feet or 50 feet in length 220; it just depends on the desired functionality of such a tool 200. The point is that the tool's 200 elongated member 205 should have sufficient integrity and length 220 to reach high places and be able to be held by one or more persons that desire to actuate a chain-driven without being concerned that the tool 205 will break upon application of force. To that end, and with reference to FIGS. 2 and 4, the elongated member 205, handle 240, hooks 235, hinges 415, rungs 430, lateral supports 435, eyelet 420, and clasped chain affixed to the elongated member 205 may be constructed of stainless steel, brass, other durable metals and alloys, hard plastics and other synthetic materials that provide the integrity necessary to withstand collapsing under applied force. These materials may include additives to prevent rusting, deleterious effects cause by the weather, and other additives to grant a longer life to the tool 200. Furthermore, painting, coatings, or applying fabric, rubberlike or other topicals to the rungs 430 may mitigate or prevent damage to the tool's components caused by repeated metal-on-metal action.

Returning to the integrity of the tool 200, its 200 components may be solid, hollow or a mixture thereof. Material science is teeming with light-weight and incredibly strong materials, which could be used for any or all parts in this disclosure. So, weight is not the determiner of whether the tool 200 has integrity. The amount of the hollow-to-solid spectrum matters for the length 220 of the elongated member 205. If there is little to no hollow portions along the length 220, then there will be little to no concentric collapse and extension of the same under the assumption that the elongated member's 205 interior is circular-like; naturally, it could just as easily be another geometric shape that imparts the ability for concentricity. However, if there is great concentricity, then the length 220 of the elongated member 205 would seriously shorten and enable easy storage in a home's garage, a factory's maintenance room, a plant's equipment room, and so forth. If the concentric permitted the hooks 235 to be on the outermost portion of the concentric collapse of the tool 205, then this may provide the smallest length 220 of the tool 205 without having to remove to hooks 235—a particularly difficult removal if the hooks 235 are affixed with weld, strong adhesion, or deep screws with uncommon heads; furthermore, removal of the hooks 235 may not be possible if the hooks 235 were integrally formed into the elongated member 205.

Still with reference to FIG. 2, other aspects of the tool 200 are discussed in more detail. One side or portion of the tool 200 has a first set 230 of hooks 235 affixed to the elongated member 205. One terminus 245 on each of the hooks 235 is affixed to the elongated member 205 by welding, screwing, adhering with a material suitable for bonding to terminus 245 and elongated member 205, whether the terminus 245 and elongated member 205 are made from the same or a different material. Another means of attaching terminus 245 to the elongated member 205 is for the terminus 245 to be integrated into the elongated member 205 by, for instance, extruding the terminus 245 and elongated member 205 from the same material(s). The other terminus 250 of each of the hooks is for engaging with the openings in chain link associated with the chain-operated assembly. That is, terminus 250 of each hook in the first set 230 is there to mate with the open portions existing between the links of chain. To facilitate better engagement, the hooks 235 in the first set 230, which would typically comprise at least 3 hooks 235 and likely many more, are spaced equidistantly so as to match up with the open spaces between the links in the chain around the chain-operated assembly. Although not drawn to scale, FIG. 2 shows a handle 240 for the user to grab as the user lifts the tool 200 into the air to reach a highly placed chain-operated assembly that needs to be opened or closed by actuating the chain, a task made possible by the tool's 200 hooks 235 engaging with the open spaces between the links of the chain and either pushing or pulling to move the chain in the direction sought, i.e., to close or open the chain-operated assembly. As shown, the handle 240 is attached to the elongated member 205 and is in an offset, parallel position relative to the first set 230.

Figure 3:
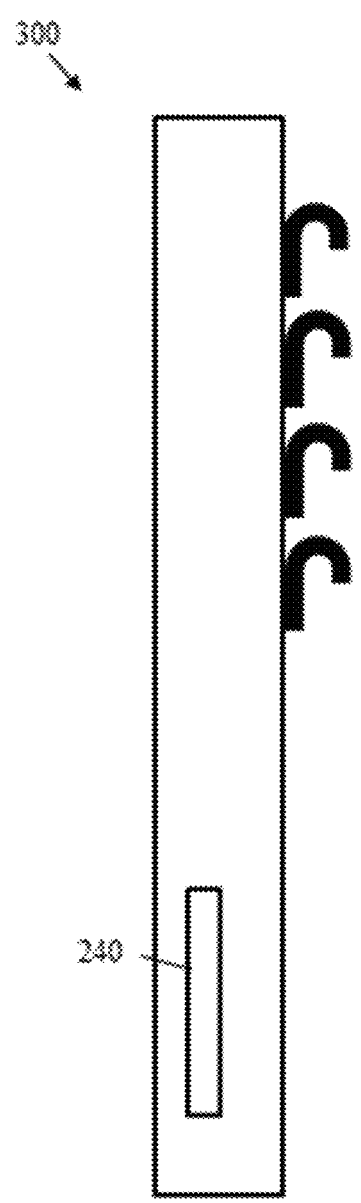
FIG. 3 depicts another example embodiment of a tool in accordance with the disclosed apparatuses and methods, wherein the figure is a side view as seen from another side of the tool. For instance.

Moving on to FIG. 3, another depiction of the tool 300 is envisaged. Broadly speaking, FIG. 3 is the same depiction as FIG. 2, but FIG. 3 has been turned a positive ninety degrees so that the handle 240 shown in FIG. 2 is now in the foreground of FIG. 3. Although not depicted, the handle 240 could be wider or longer, placed higher or lower on the elongated member 205, moved more right or left to its 240 present position on the elongated member 205, have a different shape, include handgrips to ensure the user has a tighter grip on the handle 205, include more than one handle 205 on the elongated member 205, and so forth. For instance, for a tool 200, 300 having two handles, one of these handles could be as depicted, i.e., handle 240, and another one could be replicated as far as height, length, shape, and so forth 180 positive degrees from handle 205. In this manner, a user could raise the tool 200, 300 into the air with one hand grabbing handle 205 and another hand grabbing the other handle. Additionally and alternatively, two handles could be staggered and closer together to allow greater pulling and pushing of the hooks 235 engaging the open spaces between the links of the chain-operated assembly.

Figure 4:
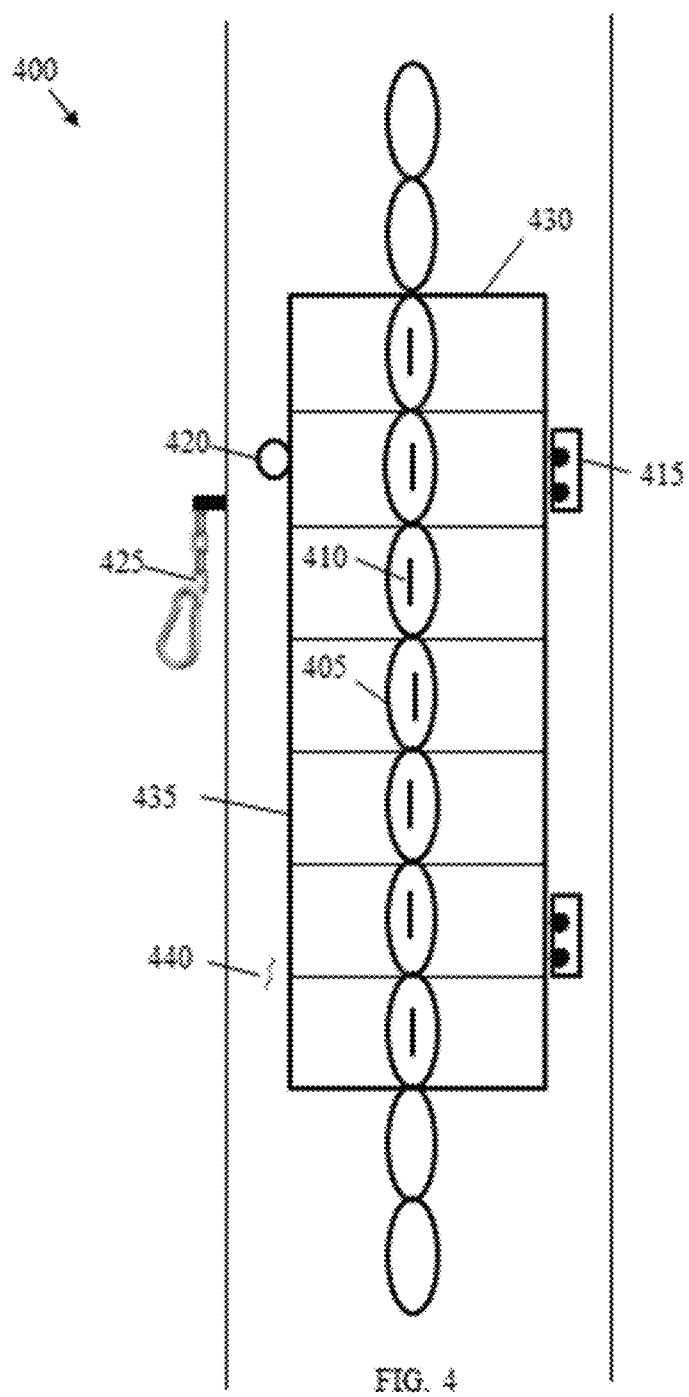
FIG. 4 depicts another example embodiment of a tool in accordance with the disclosed apparatuses and methods, wherein the figure is a front view as seen from a left side of the tool, and further wherein this depicted example embodiment also shows an example locking mechanism in accordance with the disclosed apparatuses and methods.

Coming now to FIG. 4, the locking mechanism is discussed and displayed. After the several of the tool's 400 hooks 235, 410 have engaged the open spaces between the links (e.g., 405) of the chain-operated assembly, the tool 400 may optionally include a locking mechanism for added security. In the depicted locking mechanism, a ladder-looking structure has equally spaced rungs 430 supported by two vertical supports 435 located on opposite sides of the rungs 430. The ladder-looking structure is hinged 415 to the elongated member's 440 surface so that the ladder looking structure can open and close. When several of the tool's 400 hooks 235, 410 have engaged the open spaces between the links (e.g., 405) of the chain-operated assembly, and the user wishes to lock this arrangement into position, the ladder-looking structure is swung shut. A hook (e.g., carabiner hook) on a chain 425 is welded, integrated or otherwise affixed to the elongated member 440. Depending on the attachment means of the hook on the chain 425, the hook on the chain 425 may be removably attachable to the elongated member 440. With the ladder-looking structure in the closed position over the hooked 410 chain links 405, the hook on the chain 425 mates with an eyelet 420 securely affixed, such as the types previously discussed, to one of the vertical supports 435. Upon mating, the locking mechanism is achieved because the rungs 430 are securely pressing against the hooked 410 chain links 405. With this additional and optional security achieved through the locking mechanism, the user may pull down or push on the chain as the case may be for the operation at hand. The locking, of course, is reversible by unhooking the hook on the chain 425 from the eyelet 420.

Although not depicted, the Figures, in particular FIG. 2, show only one set 230 of hooks 235 on the elongated member 205. The elongated member 205, however, may include yet additional sets of hooks located elsewhere on the elongated member 205, whereby each of these additional set of hooks are also equidistantly spaced relative to the hooks within its set, but are not equidistantly spaced relative to the hooks in any other sets appearing on the elongated member 205. The purpose of multiple sets of hooks having unique equidistant spacing within a set are for providing a tool or tools that can engage with differently sized open spaces of links for different chains. That is, not all chains are made with the same open spaces between links. Some chains have small open spaces between links, and other chains have very large open spaces between links. Placing more than one set of hooks on a tool at a different location on the same elongated member means that the tool may be used with more than one type of chain.

Figure 5:
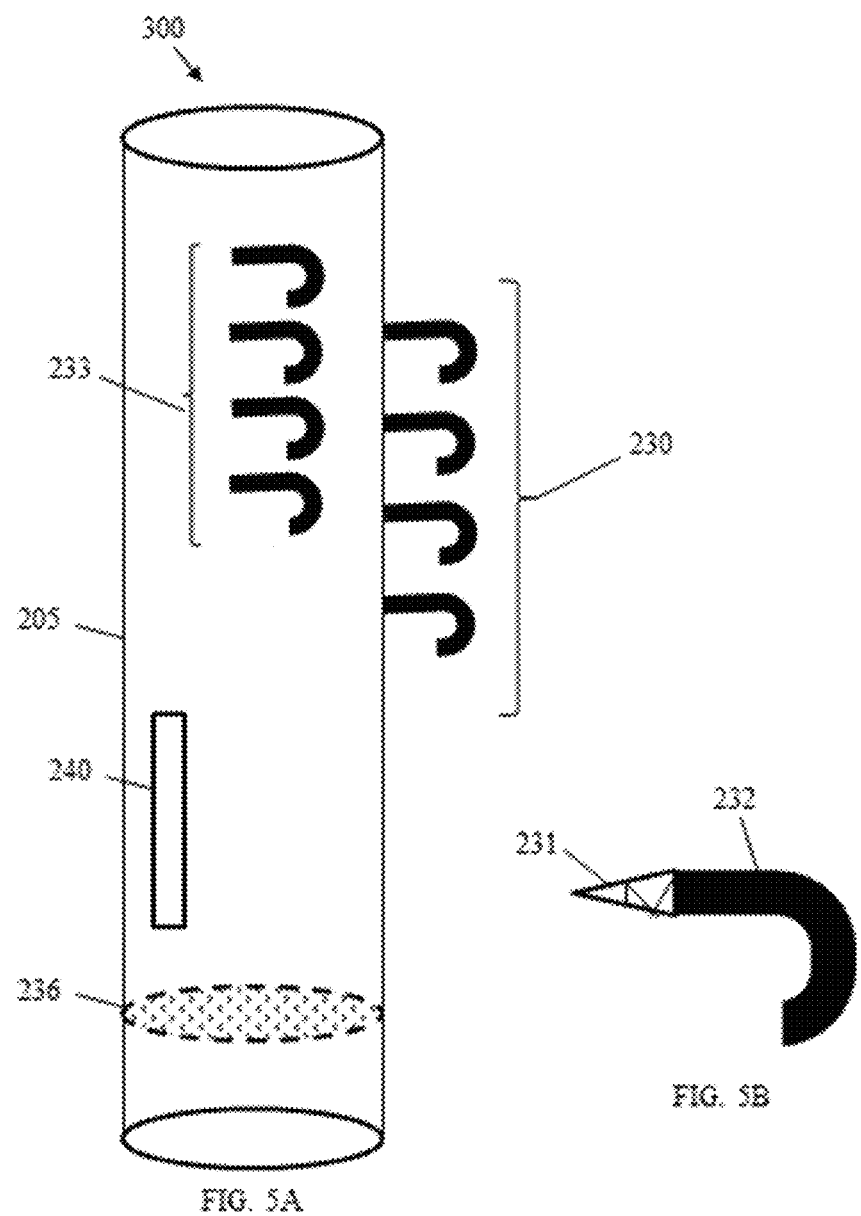
FIG. 5A depicts another example embodiment of a tool in accordance with the disclosed apparatuses and methods, wherein the figure is a side view of the tool having an elongated member with an ellipsoidal cross section and two sets of hooks, wherein one set has equidistantly spaced hooks that are spaced differently as compared to the other set's hooks, and one set is in a different location on the tool as compared to the other set.
FIG. 5B depicts another example embodiment of a hook having a threaded terminus, in accordance with in accordance with the disclosed apparatuses and methods.

With reference to FIG. 5A, depicted is the tool 300, wherein the elongated member 205 has an ellipsoidal cross section 236 as compared to the rectangular cross section of the elongated member 205 in FIGS. 2 and 3. The tool 300 has a handle 240 as well as first set 230 of equidistantly spaced hooks and at least another set 233 of equidistantly spaced hooks. The hooks in the first set 230 are spaced differently as compared to the at least another set's 233 hooks. Furthermore, the first set 230 is in a different location on the tool 300 as compared to the at least another set 233. Turning to FIG. 5B, a hook 232 is depicted as having a threaded terminus 213.

Figure 6:
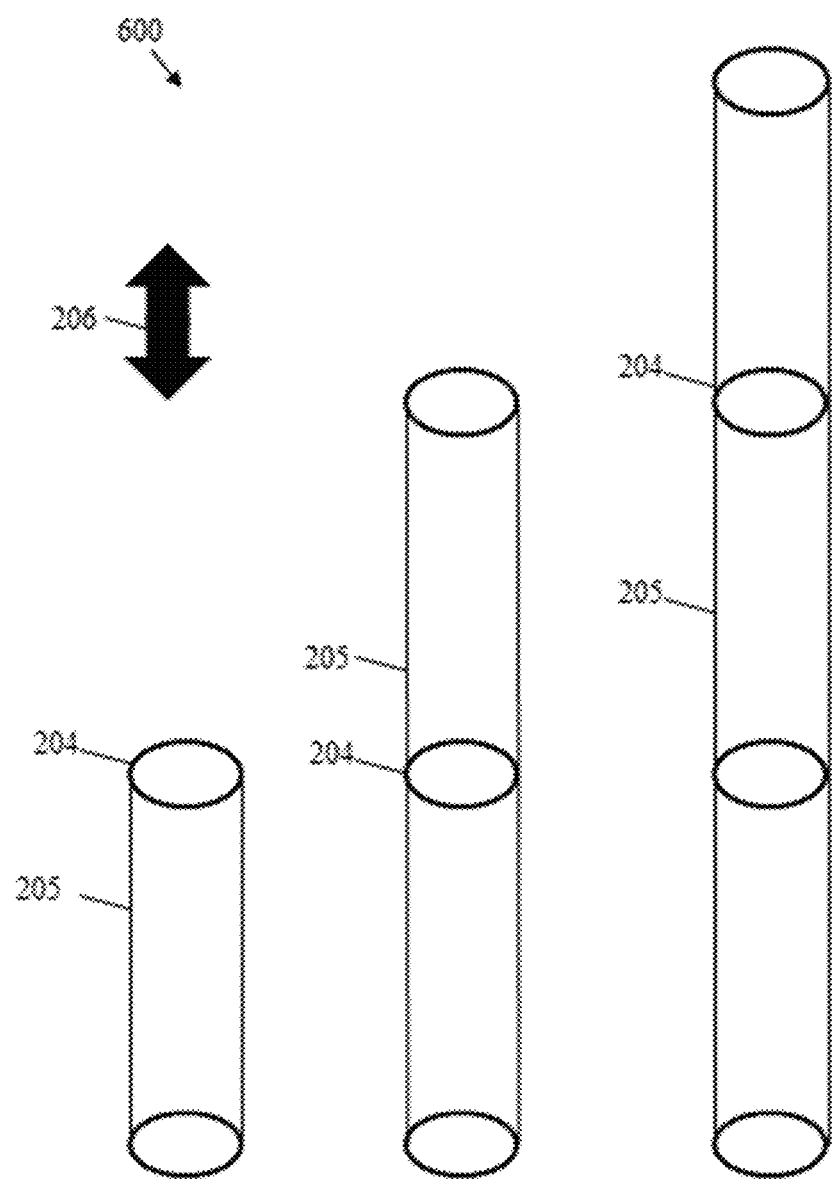
FIG. 6 depicts another example embodiment of a tool in accordance with the disclosed apparatuses and methods, wherein the tool, in the direction of the depicted arrows, telescopes for adjusting the length of the elongated.

Finally, with reference to FIG. 6, depicted are three embodiments of the tool 600 that telescopes for adjusting the length of the elongated member 205. In FIG. 6, the same tool 600 is depicted at three different stages of elongation, wherein elongation or retraction is of the elongated member 205 is shown to occur in the directions of the arrow 206. Telescoping between maximum and minimum positions may be viewed as "partially telescoping." As is known in the art, telescoping may occur by concentrically collapsing portions of a hollow tube, such as elongated member 205, are pulled upward 206 for elongation, and may be secured into place by rotating in a direction normal to elongation, such as at a joint 204, or by inserting a pin into a non-depicted hole located along the tube, such as elongated member 205, or in another securing manner as is known in the art.

While the foregoing is directed to example embodiments of the disclosed invention, other and further embodiments of the invention may be devised without departing from the basic scope thereof, and the scope thereof is determined by the claims that follow.

What is claimed is:

1. A tool comprising:
    an elongated member having a top, a bottom, and a length greater than a width;
    a first set of equidistantly spaced hooks in a linear arrangement along the length, wherein the first set is located closer to the top than the bottom;
    at least one handle in an offset, parallel position relative to the first set, wherein the at least one handle is located both closer to the bottom than the top and below the first set; and
    a locking mechanism mounted to the tool for securing one or more of the equidistantly spaced hooks for engaging one or more chain links before optionally locking the locking mechanism into a final position.

2. The tool of claim 1, further comprising at least another set of equidistantly spaced hooks in a linear arrangement along the length and in a different location than the first set.

3. The tool of claim 1, further comprising at least another set of equidistantly spaced hooks in a linear arrangement along the length and in a different location than the first set, wherein spacing among the equidistantly spaced hooks in the at least another set is different than in the first set.

4. The tool of claim 1, wherein the locking mechanism comprises a plurality of equally spaced transverse rungs, wherein two vertical supports located on opposite sides provide the equally spaced transverse rungs with lateral supports.

5. The tool of claim 1, wherein the locking mechanism has at least one hinge on the tool.

6. The tool of claim 1, further comprising at least one chain secured to the elongated member, wherein the at least one chain terminates in a clasp for mating with an eyelet fixed to the elongated member, and, thereby, enables locking down the one or more hooks engaged with the one or more chain links.

7. The tool of claim 1, wherein the elongated member is a pole.

8. The tool of claim 1, wherein the elongated member comprises metal.

9. The tool of claim 1, wherein the elongated member comprises plastic.

10. The tool of claim 1, wherein the elongated member comprises wood.

11. The tool of claim 1, wherein the elongated member has a rectangular cross section.

12. The tool of claim 1, wherein the elongated member has an ellipsoidal cross section.

13. The tool of claim 1, wherein the elongated member is solid.

14. The tool of claim 1, wherein the elongated member is hollow.

15. The tool of claim 1, wherein the equidistantly spaced hooks, and one or more handles, have one or more mechanisms for attachment to the elongated member, wherein the one or more mechanisms are selected from a group consisting of weld, adhesion, screw, integration, and combinations thereof.

16. The tool of claim 1, wherein the equidistantly spaced hooks comprise at least three hooks.

17. The tool of claim 1, wherein one or more of the equidistantly spaced hooks have a threaded terminus for screwing into the elongated member.

18. The tool of claim 1, wherein the equidistantly spaced hooks have a first terminus and a second terminus, wherein the first terminus is attached to the elongated member, and the second terminus is oriented toward the bottom of the elongated member to facilitate pulling action.

19. The tool of claim 1, wherein the elongated member at least partially telescopes for adjusting the length of the elongated member.

20. A method of actuating a chain-operated assembly, the method comprising:
    engaging with a tool, a plurality of chain links on the chain-operated assembly, wherein the tool comprises:
    an elongated member having a top, a bottom, and a length greater than a width;

a first set of equidistantly spaced hooks in a linear arrangement along the length, wherein the first set is located closer to the top than the bottom;

at least one handle in an offset, parallel position relative to the first set, wherein the at least one handle is located both closer to the bottom than the top and below the first set; and a locking mechanism mounted to the tool for securing one or more of the equidistantly spaced hooks for engaging one or more chain links before optionally locking the locking mechanism into a final position; and applying subsequent to the engaging, a force with the tool to actuate the plurality of chain links of the chain-operated assembly.

21. The method of claim 20, wherein the applying tightens a seal of the chain-operated assembly.

22. The method of claim 20, wherein the applying loosens a seal of the chain-operated assembly.

23. The method of claim 20, further comprising adjusting subsequent to the engaging, a locking mechanism on the tool, wherein the locking mechanism reversibly locks the first set and the plurality of chain-links.

24. The method of claim 20, further comprising locking into position a number of the equidistantly spaced hooks engaged with chain links on the tool.

\* \* \* \* \*